US012573793B2

(12) United States Patent
Kugo et al.

(10) Patent No.: US 12,573,793 B2
(45) Date of Patent: Mar. 10, 2026

(54) CHARGING CONNECTOR

(71) Applicant: JAPAN AVIATION ELECTRONICS INDUSTRY, LIMITED, Tokyo (JP)

(72) Inventors: Kazuki Kugo, Tokyo (JP); Tsubasa Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 649 days.

(21) Appl. No.: 17/986,162

(22) Filed: Nov. 14, 2022

(65) Prior Publication Data

US 2023/0198202 A1 Jun. 22, 2023

(30) Foreign Application Priority Data

Dec. 22, 2021 (JP) ................................. 2021-207883

(51) Int. Cl.
| | |
|---|---|
| *H01R 13/627* | (2006.01) |
| *B60L 53/16* | (2019.01) |
| *H01R 13/70* | (2006.01) |

(52) U.S. Cl.
CPC .......... *H01R 13/6272* (2013.01); *B60L 53/16* (2019.02); *H01R 13/701* (2013.01)

(58) Field of Classification Search
CPC ............................ H01R 13/6272; B60L 53/16
USPC ....................................................... 439/357
See application file for complete search history.

(56) References Cited

U.S. PATENT DOCUMENTS

| | | | | |
|---|---|---|---|---|
| 6,225,153 | B1 * | 5/2001 | Neblett | ................. H01R 29/00 |
| | | | | 438/188 |
| 8,562,370 | B2 | 10/2013 | Takagi et al. | |
| 9,199,551 | B2 | 12/2015 | Kahara et al. | |
| 9,599,778 | B2 * | 3/2017 | Wong | .................. G02B 6/3879 |

(Continued)

FOREIGN PATENT DOCUMENTS

| | | |
|---|---|---|
| CN | 103863132 A | 6/2014 |
| CN | 214189329 U | 9/2021 |

(Continued)

OTHER PUBLICATIONS

European Office Action dated Feb. 19, 2024, issued in counterpart European Application No. 22207336.3.

(Continued)

*Primary Examiner* — Gary F Paumen
(74) *Attorney, Agent, or Firm* — Holtz, Holtz & Volek PC

(57) ABSTRACT

A charging connector comprises a lock lever having a latch, a cooperation portion, a switch mechanism and a temporary maintenance mechanism. The latch is movable between an engageable position and a released potion via a predetermined position. The switch mechanism is located at an initial position when the latch is located at the engageable position. The switch mechanism includes a pressed portion. The temporary maintenance mechanism temporarily maintains the switch mechanism at the initial position when the latch is located between the engageable position and the predetermined position. When the latch is located between the predetermined position and the released position, the cooperation portion presses the pressed portion of the switch mechanism to move the switch mechanism from the initial position against the temporary maintenance mechanism and thereby changes a state of the switch body from the initial state to a released state.

6 Claims, 8 Drawing Sheets

(56)                    References Cited

U.S. PATENT DOCUMENTS

| | | | |
|---|---|---|---|
| 11,139,616 B2 * | 10/2021 | Takagi | ............... H01R 13/6397 |
| 2015/0111408 A1 | 4/2015 | Sasaki et al. | |
| 2015/0155656 A1 | 6/2015 | Sugiyama et al. | |
| 2020/0021056 A1 * | 1/2020 | Cao | ......................... B60L 53/16 |
| 2021/0257781 A1 | 8/2021 | Takagi | |

FOREIGN PATENT DOCUMENTS

| | | | |
|---|---|---|---|
| DE | 102006024431 A1 | 11/2007 | |
| EP | 2863488 A1 | 4/2015 | |
| EP | 2882047 A1 | 6/2015 | |
| JP | 2012099254 A | 5/2012 | |
| JP | 2021114881 A | 8/2021 | |

OTHER PUBLICATIONS

Extended European Search Report (EESR) dated May 11, 2023, issued in counterpart European Application No. 22207336.3.
Japanese Office Action (and an English language translation thereof) dated Jul. 16, 2025, issued in counterpart Japanese Application No. 2021-207883.
Chinese Office Action (and an English language translation thereof) dated Nov. 21, 2025, issued in counterpart Chinese Application No. 202211464433.3.
Japanese Office Action (and an English language translation thereof) dated Oct. 8, 2025, issued in counterpart Japanese Application No. 2021-207883.

* cited by examiner

10

19 (10)

19 (10)

19 (10)

19 (10)

40

48

46

47

49

42

45

43

Z

Y ⊗ → X

40

62

48

46

47

49

422

42

45

43

462

464

Z

Y X 30 (20)

14 (10)

14 (10)

14 (10)

14 (10)

CHARGING CONNECTOR

CROSS REFERENCE TO RELATED APPLICATIONS

This application is based on and claims priority under 35 U.S.C. § 119 to Japanese Patent Application No. JP 2021-207883 filed Dec. 22, 2021, the content of which is incorporated herein in its entirety by reference.

BACKGROUND OF THE INVENTION

This invention relates to a charging connector.

For example, this type of connector is disclosed in JP2012-099254A (Patent Document 1), the content of which is incorporated herein by reference.

Referring to FIG. 16, Patent Document 1 discloses a connector 90 mateable with a mating connector 98. The connector 90 supplies electric power to the mating connector 98 under a mated state where the connector 90 is mated with the mating connector 98. Thus, the connector 90 is a charging connector.

The connector 90 comprises a lock lever 91, a switch 93 and a pressable portion (operation portion) 95. The lock lever 91 has an engagement portion (latch) 92. The switch 93 has a driving portion 94. The operation portion 95 can operate a release portion 96. The lock lever 91 is supported by a shaft so that the latch 92 is vertically movable.

The latch 92 has been moved downward under an intermediate state shown in FIG. 16 where the connector 90 is in process of being mated with the mating connector 98. The latch 92 is moved upward under the mated state (not shown). When the latch 92 is moved upward, the latch 92 is engaged with an engagement portion (mating latch) 99 of the mating connector 98 to be locked. Electric power is supplied to the mating connector 98 under this state. When the operation portion 95 is operated after the charging of electric power, the release portion 96 pushes the lock lever 91 from below so that the latch 92 is moved downward. As a result, the latch 92 is unlocked.

When the latch 92 is moved downward, the lock lever 91 pushes the driving portion 94 of the switch 93 downward so that the switch 93 takes a released state which indicates that the lock is unlocked. When the latch 92 is moved upward, the driving portion 94 is not pressed, and thereby the switch 93 takes a state different from the released state.

As described above, according to the Patent Document 1, the state of the switch is changed in accordance with the operation of the operation portion. However, two requirements described below are required for a charging connector. The first requirement is that the state of the switch is not changed to the released state even if the operation portion is operated under a locked state where the latch is locked. The second requirement is that the release state of the switch is maintained until the mating of the connector is completed.

SUMMARY OF THE INVENTION

It is therefore an object of the present invention to provide a charging connector comprising a switch whose state is not changed to a released state even if an operation portion is operated under a locked state and is maintained to the released state until the mating of the connector is completed.

In general, when a latch is engaged, a lock portion regulates a movement of a lock lever to lock the latch. However, considering tolerance, the lock lever under the thus-locked state is provided with a play. The first requirement requires that the state of the switch is not changed as long as the lock lever is moved within the range defined by this play. Therefore, in order to satisfy the first requirement, the switch should be arranged in the vicinity of a part of the lock lever which is only slightly moved in accordance with an operation of an operation portion. More specifically, the switch should be arranged in the vicinity of a rotation shaft of the lock lever.

In order to satisfy the second requirement, the switch should continuously maintain the released state unless the latch is engaged with a mating latch. In other words, the switch should continuously maintain the released state even when the latch is merely slightly moved vertically. Therefore, in order to satisfy the second requirement, the switch should be arranged in the vicinity of a part of the lock lever which is largely moved in accordance with the operation of the operation portion. More specifically, the switch should be arranged to be apart from the rotation shaft of the lock lever.

As can be seen from the explanation described above, when a charging connector comprises a small switch which is typically used, the charging connector cannot meet both the first and second requirements.

The inventors of the present invention have conceived a new structure of a charging connector which meets the first and second requirements. According to this new structure, the charging connector is provided with a switch mechanism, a temporary maintenance mechanism and a cooperation portion. The temporary maintenance mechanism temporarily maintains the switch mechanism at an initial position. The cooperation portion controls the position of the switch mechanism in cooperation with the movement of a lock lever. In detail, the temporary maintenance mechanism locates the switch mechanism at the initial position unless the latch is moved beyond the range defined by the play of the lock lever. Moreover, the cooperation portion moves the switch mechanism against the temporary maintenance mechanism when the latch is moved beyond the range defined by the play of the lock lever. The first and second requirements can be satisfied by the functions of the switch mechanism, the temporary maintenance mechanism and the cooperation portion described above. More specifically, an aspect of the present invention provides a charging connector described below.

An aspect of the present invention provides a charging connector comprising a connector body, a lock lever, an operation portion, a cooperation portion, a switch mechanism and a temporary maintenance mechanism. The lock lever is incorporated in the connector body. The lock lever has a latch. The latch is movable in an upper-lower direction between an engageable position and a released potion via a predetermined position in accordance with an operation of the operation portion. The cooperation portion is moved in the upper-lower direction in cooperation with a movement of the latch in the upper-lower direction. The switch mechanism is incorporated in the connector body so as to be movable in the upper-lower direction. The switch mechanism is located at an initial position when the latch is located at the engageable position. The switch mechanism includes a switch body and a pressed portion. The switch body takes an initial state when the switch mechanism is located at the initial position. The temporary maintenance mechanism temporarily maintains the switch mechanism at the initial position when the latch is located between the engageable position and the predetermined position. When the latch is located between the predetermined position and the released position, the cooperation portion presses the pressed portion of the switch mechanism to move the switch mechanism from the initial position against the temporary maintenance mechanism and thereby changes a state of the switch body from the initial state to a released state.

The temporary maintenance mechanism of an aspect of the present invention temporarily maintains the switch mechanism at the initial position where the switch mechanism takes the initial state when the latch is located between the engageable position and the predetermined position or is close to the engageable position. Therefore, under a state where the latch is locked, the switch mechanism is maintained at the initial position as long as the lock lever is moved within the range defined by the play in accordance with an operation of the operation portion. Thus, the first requirement is satisfied. Moreover, the cooperation portion moves the switch mechanism from the initial position to change the state of the switch body to the released state when the latch is located between the predetermined position and the released position or is apart from the engageable position beyond the predetermined position. Therefore, the released state of the switch mechanism is maintained until the mating of the charging connector is completed so that the latch is located between the engageable position and the predetermined position. Thus, the second requirement is satisfied.

As described above, an aspect of the present invention provides a charging connector comprising a switch whose state is not changed to a released state even if an operation portion is operated under a locked state and is maintained to the released state until the mating of the charging connector is completed.

An appreciation of the objectives of the present invention and a more complete understanding of its structure may be had by studying the following description of the preferred embodiment and by referring to the accompanying drawings.

Figure 1:
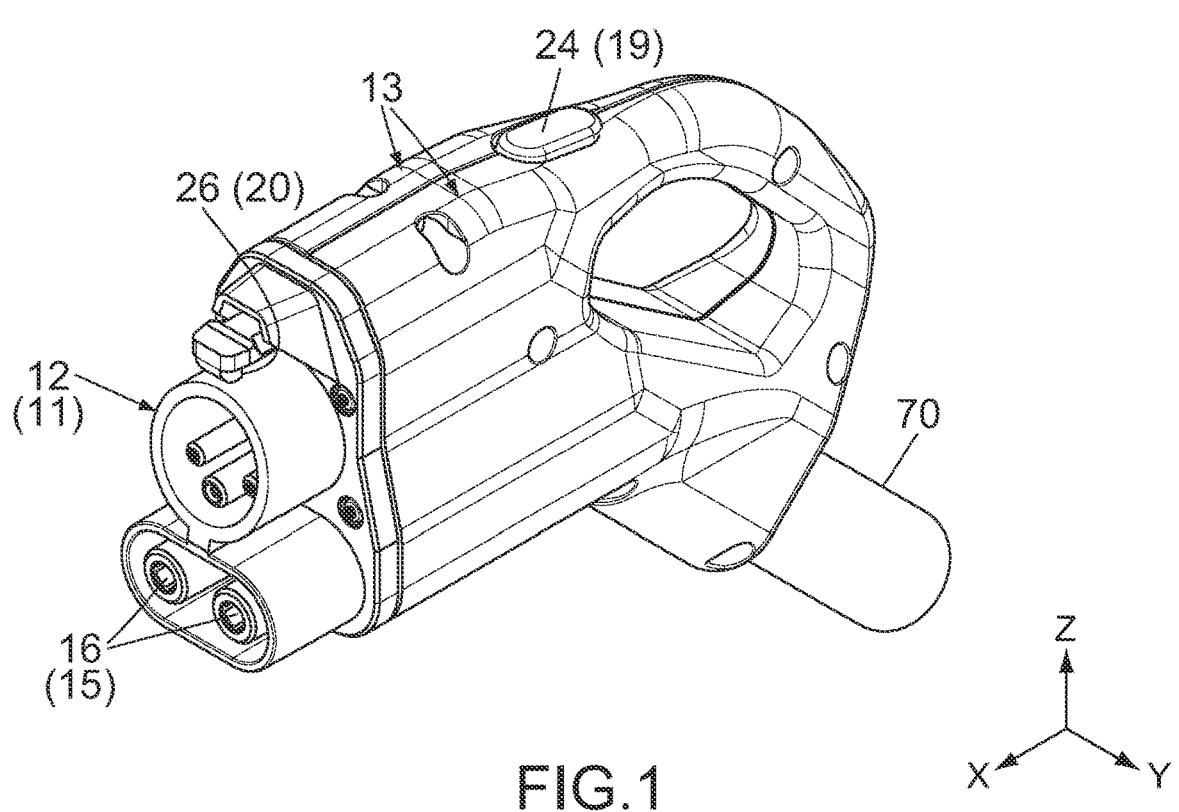
FIG. 1 is a perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a charging connector 10 according to an embodiment of the present invention is a connector which is configure to supply electric power of a power system (not shown) such as an electric vehicle (EV) station to a mating device (not shown) such as a power charging device incorporated in an electric vehicle.

Figure 2:
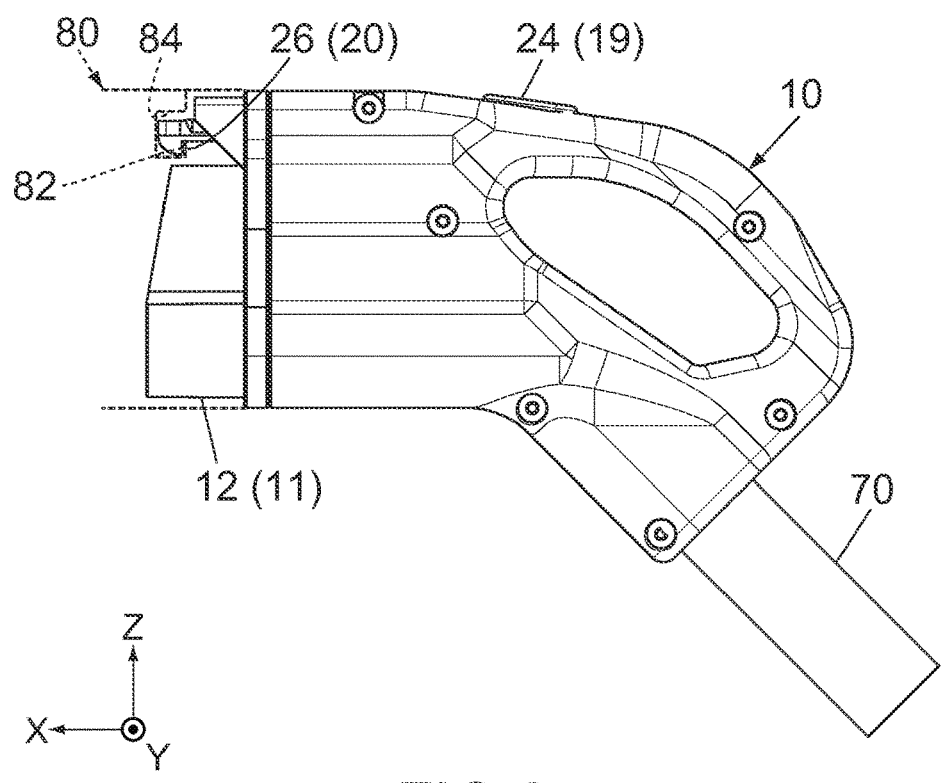
FIG. 2 is a side view showing the connector of FIG. 1, wherein a part of an outline of an inlet is illustrated with dashed line.

Referring to FIG. 2, the charging connector 10 is connected to the power system (not shown) via a cable 70. The mating device (not shown) has an inlet 80 incorporated therein. The charging connector 10 is mateable with the inlet 80 along a front-rear direction. The front-rear direction of the present embodiment is the X-direction. In the present embodiment, "forward" means the positive X-direction, and "rearward" means the negative X-direction. Under a mated state where the charging connector 10 and the inlet 80 are mated with each other as shown in FIG. 2, electric power of the power system is supplied to the mating device via the cable 70, the charging connector 10 and the inlet 80.

Hereafter, explanation will be made about the charging connector 10 of the present embodiment.

Figures 3, 4:
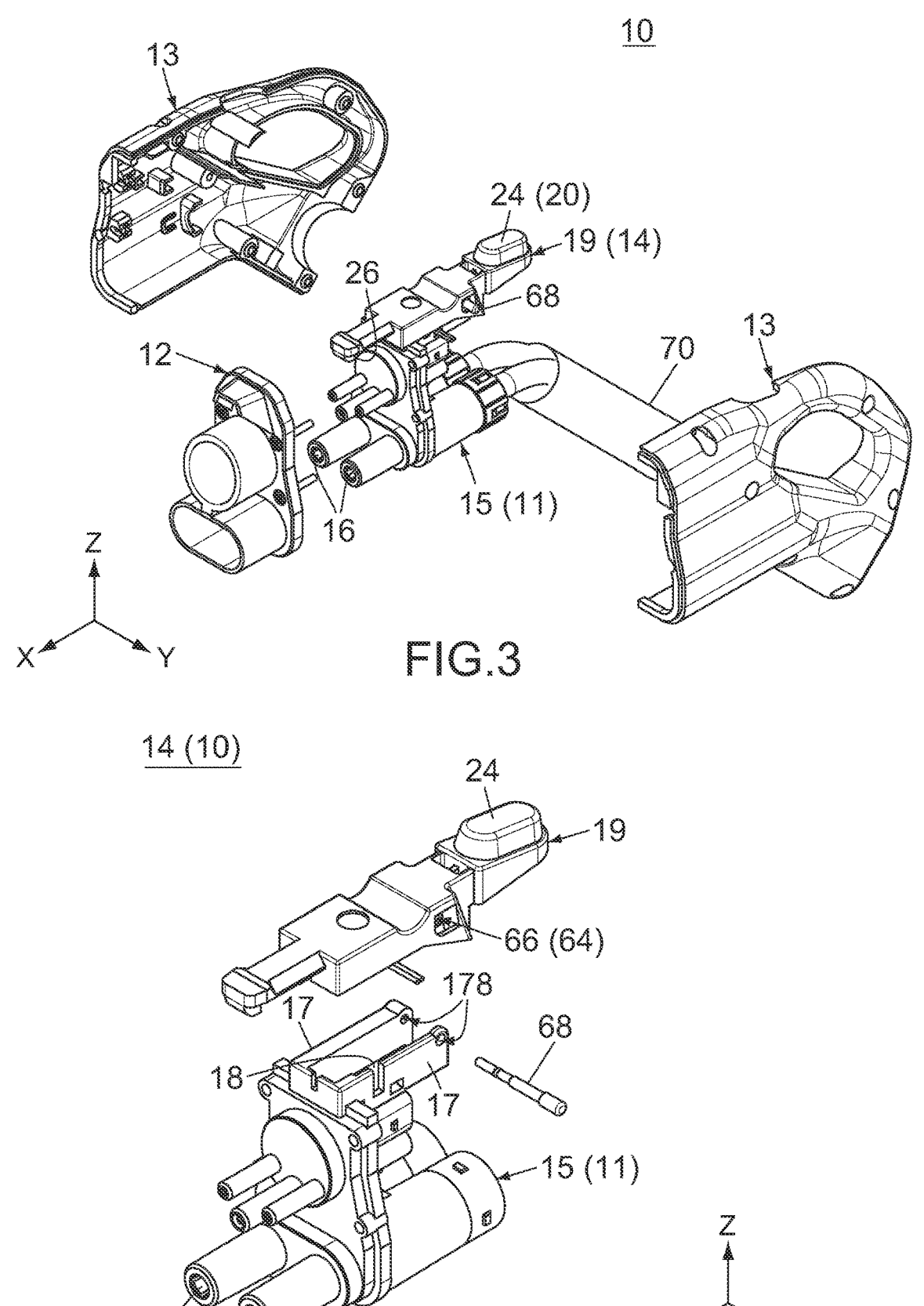
FIG. 3 is an exploded, perspective view showing the connector of FIG. 1.
FIG. 4 is an exploded, perspective view showing an inner assembly of the connector of FIG. 3.

Referring to FIGS. 1 and 3, the charging connector 10 of the present embodiment comprises a front cover 12 mainly made of insulator, two side covers 13 each mainly made of insulator, a charging unit 15, a sub-assembly 19 and a rotation axis 68 made of metal. The front cover 12, the side covers 13 and the charging unit 15 are combined into a connector body 11. Thus, the charging connector 10 comprises the connector body 11, the sub-assembly 19 and the rotation axis 68. The connector body 11 includes the front cover 12, the side covers 13 and the charging unit 15.

The charging unit 15 is a member which provides a charging function to the charging connector 10 and is connected to the cable 70. The sub-assembly 19 is a member for controlling the charging. The rotation axis 68 is a member for attaching the sub-assembly 19 to the charging unit 15. The rotation axis 68 is a pin which has a cylindrical shape and extends straight along a lateral direction. The sub-assembly 19 and the charging unit 15 are combined with each other into an inner assembly 14 by using the rotation axis 68. The front cover 12 and the side covers 13 cover and protect the inner assembly 14.

The inner assembly 14 is accommodated in the charging connector 10 and is attached to the side covers 13 so as to be located between the two side covers 13 in the lateral direction perpendicular to the front-rear direction. The lateral direction of the present embodiment is the Y-direction. The inner assembly 14 which is attached to the side covers 13 is covered by the front cover 12 from front.

The charging unit 15 of the present embodiment includes two terminals 16 each made of conductor. Each of the terminals 16 is connected to a core wire (not shown) of the cable 70 and can receive electric power of the power system (not shown). Referring to FIG. 4, the charging unit 15 has two side walls 17. Each of the side walls 17 is located on an upper end of the charging unit 15 in an upper-lower direction perpendicular to both the front-rear direction and the lateral direction. The upper-lower direction of the present embodiment is the Z-direction. In the present embodiment, "upward" means the positive Z-direction, and "downward" means the negative Z-direction. The two side walls 17 are apart from each other in the lateral direction and extend in parallel to each other along a vertical plane (XZ-plane) perpendicular to the lateral direction.

Each of the side walls 17 is formed with a press-fit hole 178. Each of the press-fit holes 178 is a circular hole and passes through the side wall 17 in the lateral direction. Each of the press-fit holes 178 has a size which allows the rotation axis 68 to be press-fit thereto. The two press-fit holes 178 are located at positions same as each other in the XZ-plane.

Figure 12:
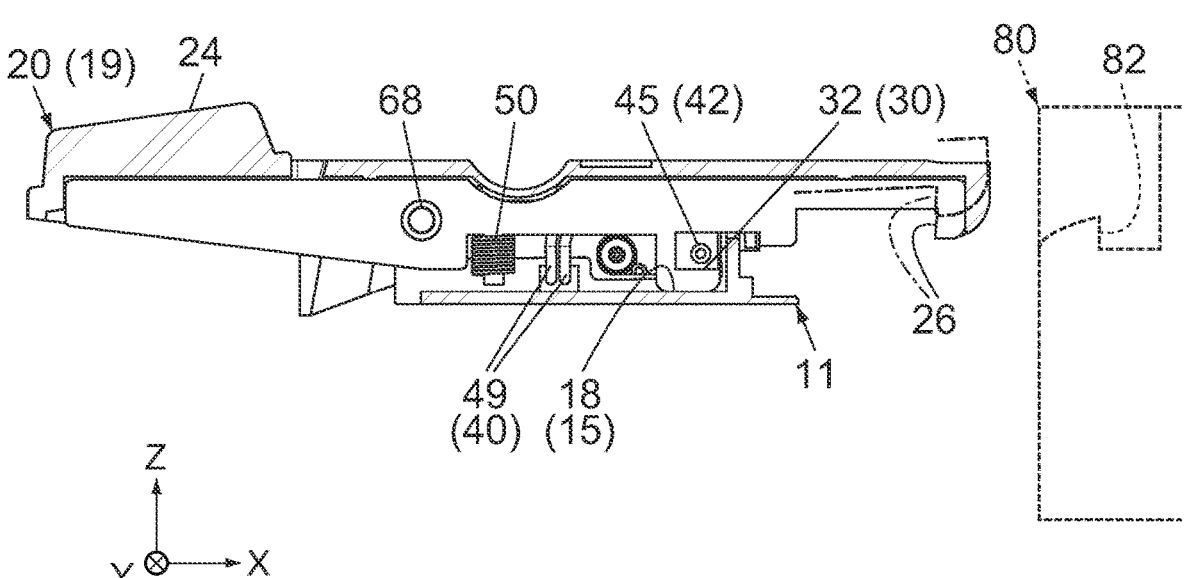
FIG. 12 is a cross-sectional view showing the inner assembly of the connector of FIG. 3, wherein the connector is under a separated state where the connector is separated from the inlet, a latch is located at an engageable position, not the whole of but only an upper end of a charging unit is illustrated, a part of an outline of the inlet is illustrated with dashed line, and an outline of the latch located at a released position is illustrated with chain dotted lines.

The charging unit 15 has a catch portion 18. Thus, the connector body 11 comprises the catch portion 18. The catch portion 18 is located at lower ends of the side walls 17 in the upper-lower direction and is located between the two side walls 17 in the lateral direction. The catch portion 18 is a part for catching a part of a lower end of the sub-assembly 19 as described later. Referring to FIGS. 4 and 12, the catch portion 18 of the present embodiment is a planar surface which extends along a horizontal plane (XY-plane) perpendicular to the upper-lower direction. However, the present invention is not limited thereto. For example, the shape of the catch portion 18 is not specifically limited. Moreover, the catch portion 18 may be a part of a member other than the charging unit 15.

Referring to FIG. 4, the sub-assembly 19 is formed with a central hole 66. The central hole 66 is a circular hole and passes through the sub-assembly 19 in the lateral direction. The central hole 66 has a size which allows the rotation axis 68 to be inserted therein substantially with no friction. Referring to FIG. 3 together with FIG. 4, the sub-assembly 19 is attached to the charging unit 15 and is arranged so that the central hole 66 is located between the two press-fit holes 178 of the charging unit 15 in the lateral direction. The rotation axis 68 is press-fit into the two press-fit holes 178 while a part thereof passes through the central hole 66. The thus-attached sub-assembly 19 is movable relative to the charging unit 15. More specifically, the sub-assembly 19 is movable in a seesaw manner about the rotation axis 68. For example, when a rear end of the sub-assembly 19 is pushed downward, a front end of the sub-assembly 19 is moved upward.

Referring to FIG. 3, the inner assembly 14 which is assembled as described above is covered by the front cover 12 and the side covers 13 of the connector body 11 as previously described. The charging unit 15 of the inner assembly 14 is fixed so as not to be moved relative to the front cover 12 and the side covers 13. In contrast, the sub-assembly 19 of the inner assembly 14 is incorporated so as to be movable in a seesaw manner relative to the connector body 11 including the charging unit 15.

Referring to FIG. 1, the terminals 16 of the charging unit 15 extend through the front cover 12 along the front-rear direction. Referring to FIG. 2 together with FIG. 1, each of the terminals 16 is connected to the mating device (not shown) of the inlet 80 under the mated state so that electric power can be supplied to the mating device.

Referring to FIG. 3, the charging connector 10 of the present embodiment has the aforementioned structure. However, the present invention is not limited thereto, but the structure of the charging connector 10 can be variously modified as necessary. For example, the charging connector 10 may further comprise another member in addition to the connector body 11, the sub-assembly 19 and the rotation axis 68. The connector body 11 may further include another member in addition to the front cover 12, the side covers 13 and the charging unit 15. The structure of the charging unit 15 is not specifically limited.

The sub-assembly 19 may be attached to the charging unit 15 via a member different from the rotation axis 68, provided that the front end thereof is vertically movable. The sub-assembly 19 may be directly attached to the side covers 13. The sub-assembly 19 may be supported by a member such as a spring (not shown) so that the front end thereof is not vertically moved unless an external force is applied to the sub-assembly 19.

Hereafter, more specific explanation will be made about the sub-assembly 19 of the present embodiment. The structure of the sub-assembly 19 is not limited to those of the present embodiment and modifications described below but can be further modified as described later.

Referring to FIGS. 5 to 8, the sub-assembly 19 of the present embodiment includes a lock lever 20, a switch mechanism 40, a temporary maintenance mechanism (coil spring) 50, a screw 62 made of metal and a shaft 64 made of metal. Thus, the charging connector 10 of the present embodiment comprises the lock lever 20, the switch mechanism 40, the temporary maintenance mechanism 50, the screw 62 and the shaft 64. The sub-assembly 19 of the present embodiment comprises only the aforementioned members. However, the present invention is not limited thereto, but the sub-assembly 19 may further comprise another member in addition to the aforementioned members.

Figure 5:
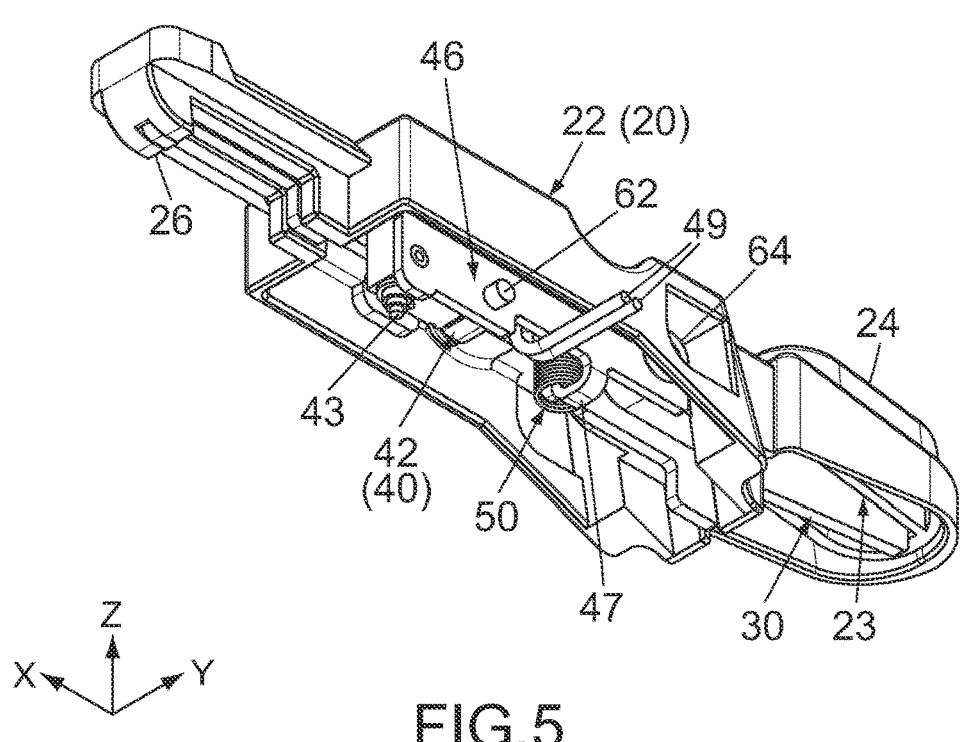
FIG. 5 is a perspective view showing a sub-assembly of the inner assembly of FIG. 4.

Referring to FIG. 5 together with FIG. 3, the sub-assembly 19 is attached to the charging unit 15 of the connector body 11 as previously described and is thereby incorporated in the connector body 11. Thus, each of the lock lever 20, the switch mechanism 40, the temporary maintenance mechanism 50, the screw 62 and the shaft 64 is incorporated in the connector body 11.

Referring to FIGS. 5 to 8, the lock lever 20 of the present embodiment includes a lever body 22 made of insulator such as resin and a reinforcement member 30 made of metal. The lever body 22 extends along the front-rear direction. The lever body 22 is formed with a press-fit groove 23. The press-fit groove 23 is formed in a lower part of the lever body 22 and extends along the front-rear direction between a front end and a rear end of the lever body 22. The reinforcement member 30 is a single metal plate which has a constant size in the lateral direction. The reinforcement member 30 has a size in the front-rear direction which is substantially same as that of the press-fit groove 23. The reinforcement member 30 is press-fit into the press-fit groove 23 from below. According to the present embodiment, the lever body 22 can be reinforced by the reinforcement member 30.

The lock lever 20 of the present embodiment has an operation portion 24, a latch 26 and a cooperation portion 32. Thus, the sub-assembly 19 includes the operation portion 24, the latch 26 and the cooperation portion 32. The charging connector 10 comprises the operation portion 24, the latch 26 and the cooperation portion 32.

The operation portion 24 is located at the rear end of the lever body 22 and protrudes upward. The operation portion 24 of the present embodiment is a part of the lever body 22 of the lock lever 20. However, the present invention is not limited thereto. For example, the operation portion 24 may be a member formed separately from the lock lever 20.

The latch 26 is located at the front end of the lock lever 20. The latch 26 of the present embodiment projects downward. In other words, the latch 26 faces downward. The latch 26 has a front end which has an arc shape. The latch 26 has a rear end which is a sloping surface sloping rearward. The latch 26 of the present embodiment is formed of the front end of the lever body 22 and a front end of the reinforcement member 30 and has a high strength. However, the present invention is not limited thereto. For example, the latch 26 may be formed only of the front end of the lever body 22. Moreover, the latch 26 may face upward as described later.

Figure 7:
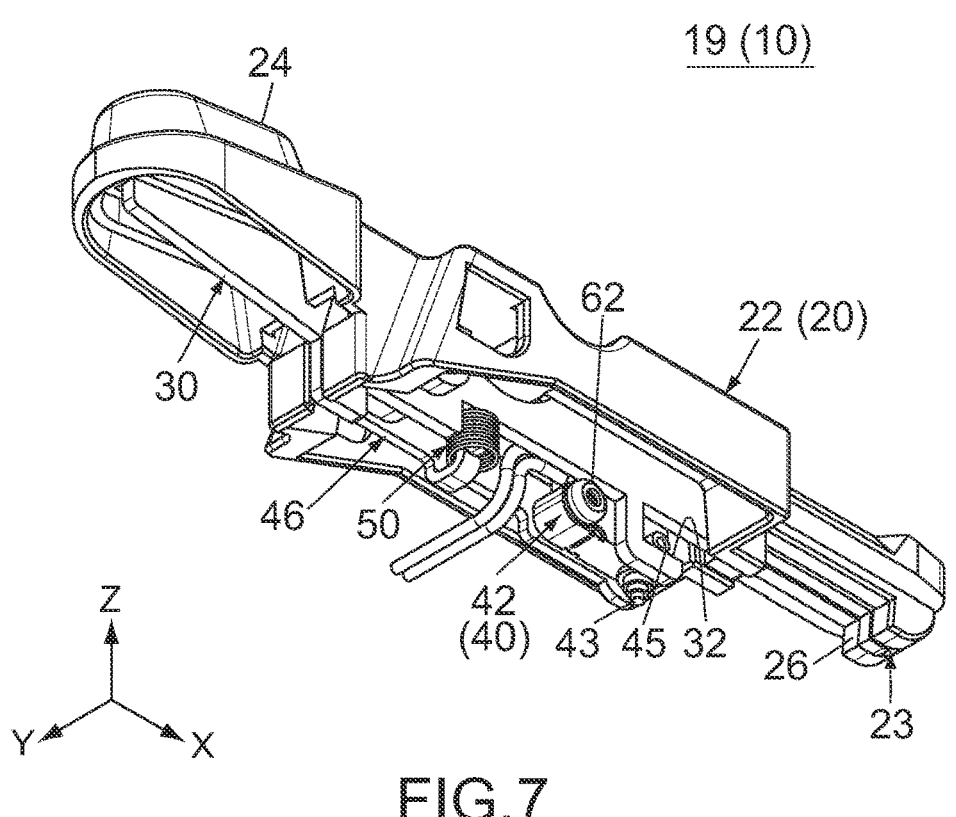
FIG. 7 is another perspective view showing the sub-assembly of FIG. 5.
Figure 8:
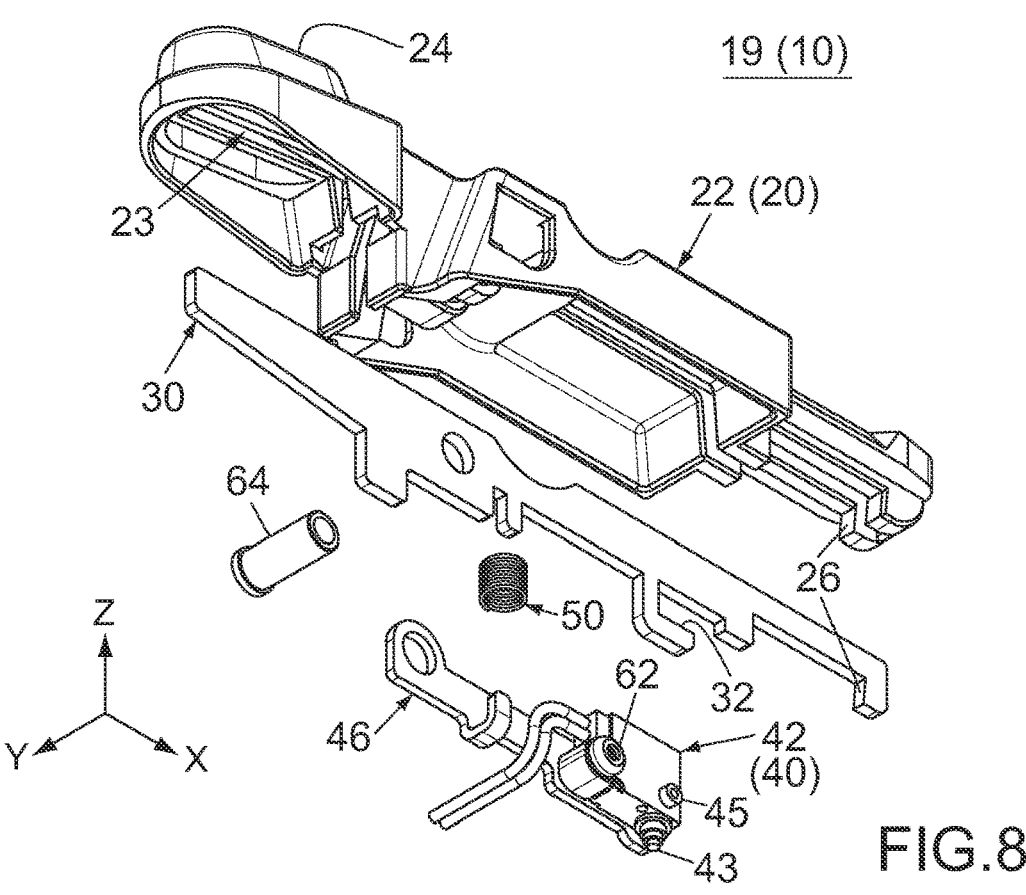
FIG. 8 is an exploded, perspective view showing the sub-assembly of FIG. 7.
Figure 11:
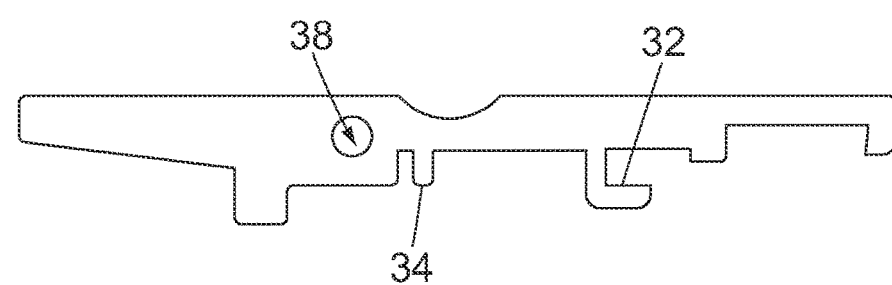
FIG. 11 is a side view showing a reinforcement member of the sub-assembly of FIG. 8.
Figure 11:
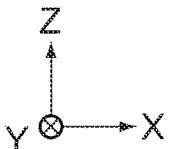

Referring to FIGS. 7 and 11, the cooperation portion 32 of the present embodiment is a part of the reinforcement member 30. Thus, the reinforcement member 30 has the cooperation portion 32. In detail, the reinforcement member 30 has a lower end which partially protrudes downward and then extends forward. The cooperation portion 32 of the present embodiment is an upper edge surface of this forward extending part.

Figures 9, 10:
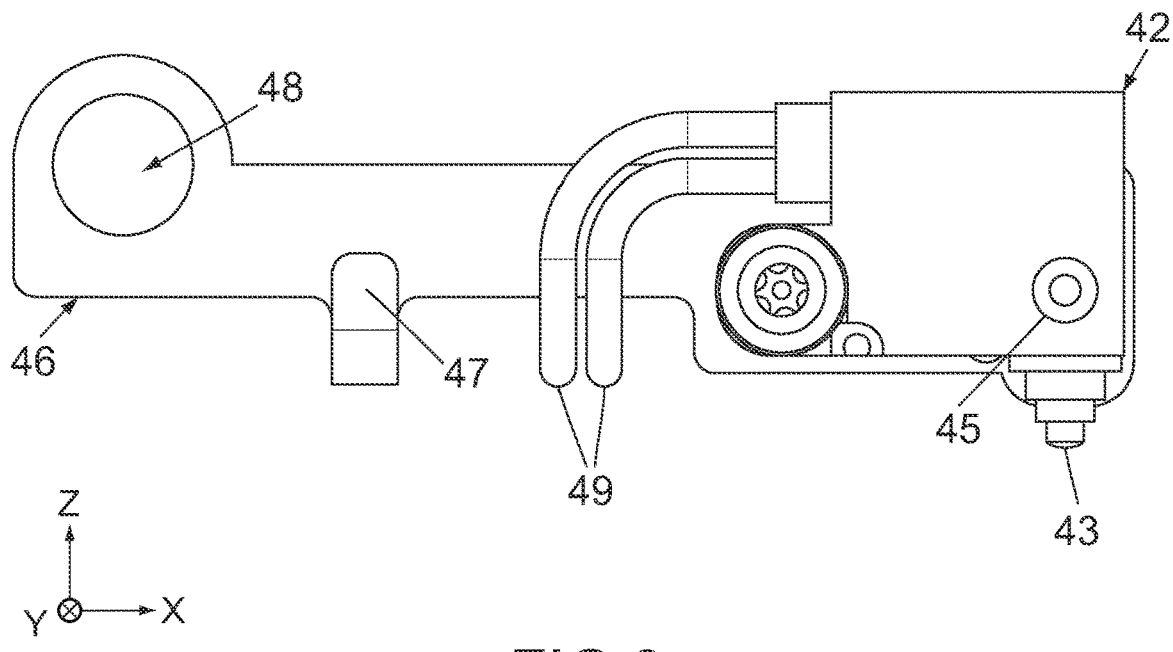
FIG. 9 is a side view showing a switch mechanism of the sub-assembly of FIG. 8.
FIG. 10 is an exploded, perspective view showing the witch mechanism of FIG. 9.

Referring to FIGS. 9 and 10, the switch mechanism 40 of the present embodiment includes a switch body 42 and a switch plate 46 made of metal. The switch body 42 has a flat-plate shape in parallel to the XZ-plane. The switch plate 46 is a single metal plate which has a constant size in the lateral direction and is formed with bends.

Figure 6:
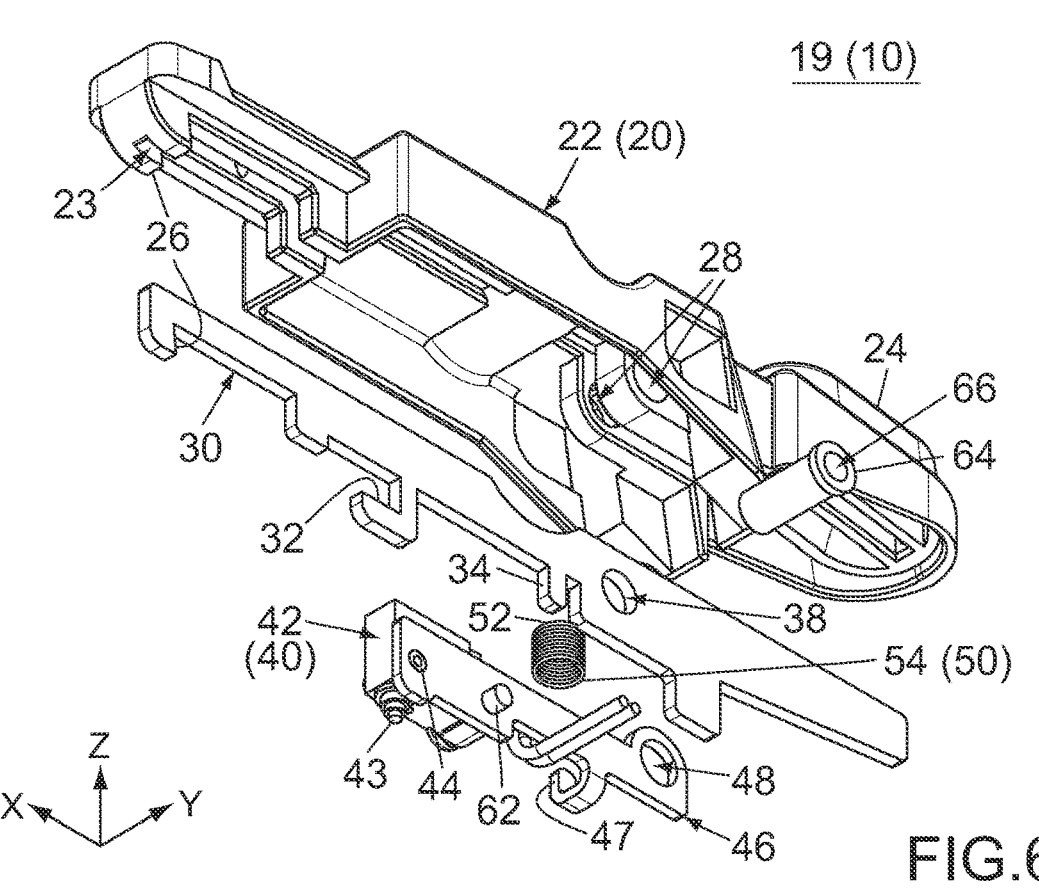
FIG. 6 is an exploded, perspective view showing the sub-assembly of FIG. 5.

Referring to FIG. 10 together with FIG. 6, the switch body 42 is formed with a screw hole 422. The screw hole 422 passes through the switch body 42 in the lateral direction. The switch body 42 has a positioning projection 44. The positioning projection 44 is provided on one of opposite surfaces of the switch body 42 in the lateral direction and project outward therefrom. The switch plate 46 is formed with a screw hole 462 and a positioning hole 464. Each of the screw hole 462 and the positioning hole 464 passes through the switch plate 46 in the lateral direction. The screw hole 462 and the positioning hole 464 are located at positions in the XZ-plane which coincide with positions of the screw hole 422 and the positioning projection 44 in the XZ-plane, respectively.

The switch body 42 and the switch plate 46 are combined with each other as described below. First, the positioning projection 44 is inserted into the positioning hole 464 so that the switch body 42 and the switch plate 46 are positioned to each other. Then, the screw 62 is screwed into the screw hole 422 through the screw hole 462. As a result, the switch body 42 and the switch plate 46 are combined with each other and fixed to each other. The switch body 42 of the present embodiment is fixed to and supported by the switch plate 46 as described above.

Referring to FIGS. 7 and 9, the switch body 42 of the present embodiment has a pressed portion 45 and a button 43. Thus, the switch mechanism 40 includes the pressed portion 45 and the button 43. The charging connector 10 comprises the pressed portion 45 and the button 43.

The pressed portion 45 is proved on one of the opposite surfaces of the switch body 42 in the lateral direction and projects outward therefrom in the lateral direction, the one of the opposite surfaces being opposite to the surface on which the positioning projection 44 (see FIG. 6) is provided. The pressed portion 45 is located at a position in the XZ-plane which is same as the position of the positioning projection 44 in the XZ-plane. As can be seen from this structure, the switch plate 46 of the present embodiment is attachable to any one of the opposite surfaces of the switch body 42 in the lateral direction.

The button 43 of the present embodiment is a push button. The switch body 42 takes one of two states different from each other in accordance with whether the button 43 is pushed or not. The switch mechanism 40 of the present embodiment includes two signal wires 49 in addition to the switch body 42 and the switch plate 46. For each of the signal wires 49, one of opposite ends thereof is connected to the switch body 42, and a remaining one (not shown) of the opposite ends is connected to the power system (not shown). The signal wires 49 send the state of the switch body 42 to the power system.

Hereafter, explanation will be made about an assembling method of the sub-assembly 19 of the present embodiment and an incorporating method of the sub-assembly 19 into the connector body 11.

Referring to FIG. 6, the lever body 22 of the present embodiment is formed with two shaft holes 28. Each of the shaft holes 28 is a circular hole and passes through a part of the lever body 22 in the lateral direction. The two shaft holes 28 are located at positions same as each other in the XZ-plane and apart from each other in the lateral direction. The reinforcement member 30 of the present embodiment is formed with a shaft hole 38. The shaft hole 38 is a circular hole and passes through the reinforcement member 30 in the lateral direction. Referring to FIG. 5 together with FIG. 6, when the reinforcement member 30 is attached to the lever body 22, the shaft hole 38 is located between the two shaft holes 28 in the lateral direction. Each of the shaft holes 28 and the shaft hole 38 which are arranged as described above has a size which allows the shaft 64 to be press-fit therein.

Referring to FIG. 6, the switch plate 46 of the present embodiment is formed with a shaft hole 48. The shaft hole 48 is a circular hole and passes through the switch plate 46 in the lateral direction. The shaft hole 48 has a size which allows the shaft 64 to be inserted therein substantially with no friction. Referring to FIG. 5 together with FIG. 6, the shaft 64 passes through the shaft hole 48 and is press-fit into the shaft holes 28 of the lever body 22 and the shaft hole 38 of the reinforcement member 30. Thus, the shaft 64 is fixed to the lock lever 20. The thus-fixed shaft 64 is formed with the aforementioned central hole 66. Referring to FIG. 4, the rotation axis 68 is inserted into the central hole 66 as previously described. Referring to FIG. 12, when the switch plate 46 (see FIG. 6) is attached to the lock lever 20 (see FIG. 6) as described above, the switch mechanism 40 is located just above the catch portion 18.

Referring to FIG. 3, according to the aforementioned structure, the lock lever 20 is turnable about the rotation axis 68. Referring to FIG. 5 together with FIG. 3, the shaft 64 is not fixed to the switch plate 46 of the switch mechanism 40. Therefore, the switch mechanism 40 is turnable relative to the lock lever 20 about the shaft 64, or about the rotation axis 68. Thus, the lock lever 20 and the switch mechanism 40 of the present embodiment are turnable independently from each other about a shaft common to them.

As described above, the switch plate 46 of the present embodiment is attached to the lock lever 20 to be turnable. The sub-assembly 19 of the present embodiment can be easily assembled by using the shaft 64 while the switch body 42 is reinforced by the switch plate 46. However, the present invention is not limited thereto. For example, the switch body 42 may be provided with no switch plate 46 and may be formed with a shaft hole (not shown). Instead, the switch mechanism 40 may be attached by a member other than the shaft 64 to be turnable relative to the lock lever 20. The center of turn of the lock lever 20 and the center of turn of the switch mechanism 40 may be different from each other.

Referring to FIGS. 6 and 11, the reinforcement member 30 of the present embodiment has an attachment portion 34. The attachment portion 34 is a part of the reinforcement member 30. The attachment portion 34 projects downward from a lower edge surface of the reinforcement member 30. Referring to FIGS. 6 and 9, the switch plate 46 of the present embodiment has an attachment portion 47. The attachment portion 47 is a part of the switch plate 46. The attachment portion 47 extends in the lateral direction from a lower edge surface of the switch plate 46 and then projects upward.

Referring to FIG. 6, the temporary maintenance mechanism 50 of the present embodiment is a coil spring which has opposite ends 52 and 54. The end 52 is located at an upper end of the coil spring 50. The end 54 is located at a lower end of the coil spring 50. One of the opposite ends 52 and 54 of the coil spring 50, or the end 54, is attached to the switch mechanism 40. A remaining one of the opposite ends 52 and 54 of the coil spring 50, or the end 52, is attached to the lock lever 20. In detail, in the present embodiment, the end 52 is attached to the attachment portion 34 of the reinforcement member 30, and the end 54 is attached to the attachment portion 47 of the switch plate 46. The thus-attached coil spring 50 can apply a downward force to the switch plate 46.

Referring to FIG. 5, the lock lever 20 and the switch mechanism 40 of the present embodiment are combined with each other into the one sub-assembly 19 by using the only one shaft 64 and the only one coil spring 50 as described above. Referring to FIG. 4, the sub-assembly 19 and the charging unit 15 are combined into the inner assembly 14 by using the only one rotation axis 68.

Referring to FIGS. 3 and 4, the charging connector 10 of the present embodiment can be easily manufactured only by attaching the only one inner assembly 14, which is an assembly of a large number of members, to the side covers 13. However, the present invention is not limited thereto. For example, the sub-assembly 19 may be supported by the side covers 13 with use of the rotation axis 68 without being combined with the charging unit 15.

Referring to FIG. 6, the button 43 of the switch mechanism 40 of the present embodiment is easily damaged if a force is applied along a direction perpendicular to an axis direction of the button 43, or the upper-lower direction in FIG. 6. According to the assembling method of the present embodiment, the button 43 can be prevented from being applied with a force which might damage the button 43 in the assembling process. Moreover, since the position of the switch mechanism 40 is fixed at the time when the inner assembly 14 is assembled, the position of the switch mechanism 40 can be precisely adjusted during the assembling process of the inner assembly 14.

As described above, according to the assembling method of the present embodiment, the charging connector 10 can be easily assembled while tolerance is reduced. In particular, the lock lever 20 and the switch mechanism 40 of the present embodiment are combined with each other by using the coil spring 50 in addition to the shaft 64. The lock lever 20 and the switch mechanism 40 which are combined with each other are incorporated in the connector body 11 (see FIG. 3) while the switch mechanism 40 is presses against the catch portion 18 (see FIG. 12) by the compressed coil spring 50.

It is difficult to properly attach the coil spring 50 in a process where the lock lever 20 and the switch mechanism 40 are incorporated in the connector body 11 (see FIG. 3) one by one. According to the present embodiment, the charging connector 10 can be easily assembled even though the charging connector 10 includes a member such as the coil spring 50 which is not easily attached. However, the present invention is not limited thereto. For example, the members included in the sub-assembly 19 may be incorporated in the connector body 11 one by one. In this instance, the upper end 52 of the coil spring 50 may be attached to the connector body 11.

Referring to FIG. 6, the switch body 42 of the present embodiment is attached to the lock lever 20 via the switch plate 46. Since the switch plate 46 is formed of a metal plate, the switch plate 46 can be shaped in various shapes and can be easily attached to the lock lever 20. For example, the switch plate 46 can be easily formed with the attachment portion 47. According to the present embodiment, the sub-assembly 19 can be more easily assembled with no increase of components. However, the present invention is not limited thereto. For example, the attachment portion 47 may be a member formed separately from the switch plate 46. The switch plate 46 may be provided as necessary.

As previously described, the lever body 22 of the present embodiment is reinforced by the reinforcement member 30. Since the reinforcement member 30 is formed of a metal plate, the reinforcement member 30 is easily shaped into various shapes. For example, the reinforcement member 30 can be easily formed with the cooperation portion 32 and the attachment portion 34. According to the present embodiment, various portions can be provided with no increase of components while the lever body 22 is reinforced. In particular, the latch 26 which tends to receive a force is reinforced. However, the present invention is not limited thereto. For example, each of the cooperation portion 32 and the attachment portion 34 may be a member formed separately from the reinforcement member 30. The reinforcement member 30 mat be provided as necessary.

The charging connector 10 which is assembled as described above is mateable with the inlet 80 (see FIG. 12) as described below.

Referring to FIGS. 1 and 2, when the inner assembly 14 is accommodated in the charging connector 10, the latch 26 of the lock lever 20 projects forward from the front cover 12, and the operation portion 24 projects upward from the side covers 13. The thus-arranged latch 26 is insertable into the inlet 80. The thus-arranged operation portion 24 is operable by an operator.

Referring to FIG. 12, when the charging connector 10 is under a separated state where the charging connector 10 is separated from the inlet 80 as shown in FIG. 12, the latch 26 of the lock lever 20 is located at an engageable position (see solid line in FIG. 12). The latch 26 is temporarily maintained at the engageable position because of its own weight or by a mechanism such as a spring (not shown), for example. When the operation portion 24 is pushed downward, the lock lever 20 is turned about the rotation axis 68, and thereby the latch 26 is moved upward (see chain dotted lines in FIG. 12).

Figure 13:
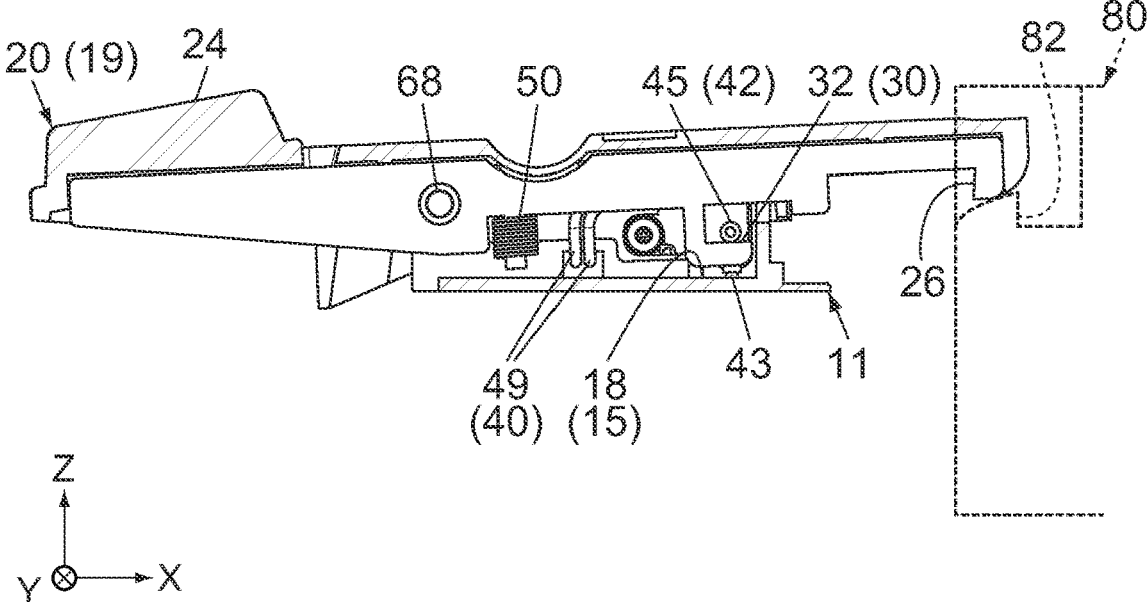
FIG. 13 is a cross-sectional view showing the inner assembly of the connector of FIG. 12, wherein the connector is under an intermediate state where the connector is in process of being mated with the inlet, and the latch is located at the released position.

Referring to FIG. 13, in an attempt of mating the charging connector 10 with the inlet 80, the charging connector 10 is moved forward and toward the inlet 80. When the charging connector 10 is moved forward, the arc-like front end of the latch 26 is brought into abutment with the inlet 80 and receive an upward force from the inlet 80. As a result, the latch 26 is inserted into the inlet 80 while being moved upward. The state of the charging connector 10 at that time is referred to as an intermediate state or a half-mated state where the charging connector 10 is not completely mated with the inlet 80. When the charging connector 10 is under the intermediate state, the latch 26 is located at an illustrated released position.

Figure 14:
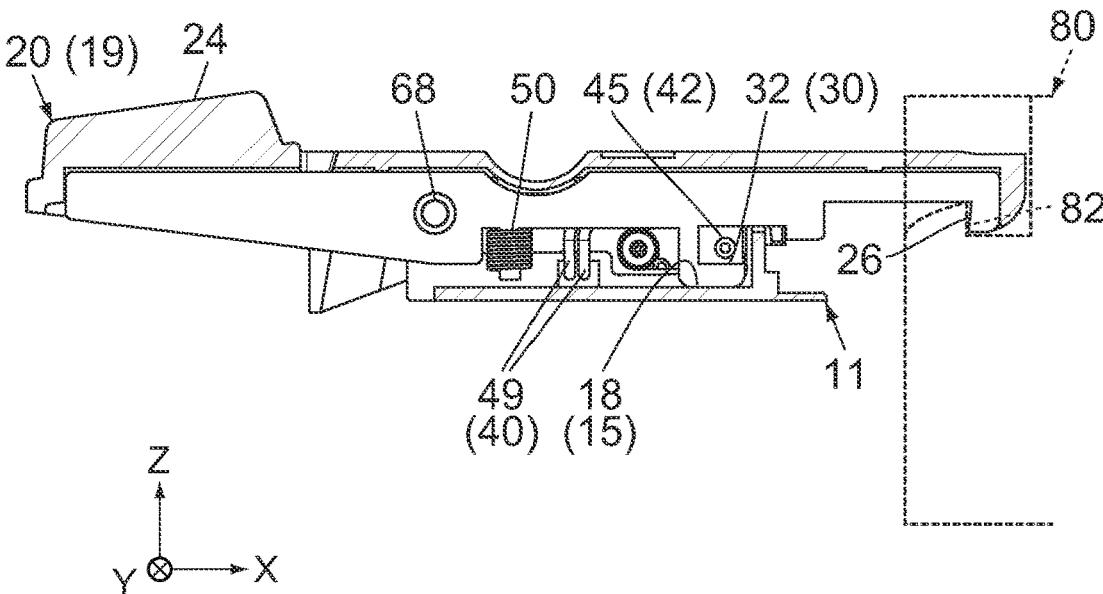
FIG. 14 is a cross-sectional view showing the inner assembly of FIG. 12, wherein the connector is under a mated state where the connector is mated with the inlet, and the latch is located at the engageable position.

Referring to FIG. 14, the inlet 80 is formed with a recessed portion which is recessed downward. The recessed portion is provided with a mating latch 82. The mating latch 82 is a planar surface in parallel to a predetermined plane (YZ-plane). When the charging connector 10 is moved forward, the latch 26 is moved to the recessed portion of the inlet 80 and is then moved downward. The latch 26 which is moved downward is located at the engageable position to be engaged with the mating latch 82. At that time, the charging connector 10 takes the mated state.

When the charging connector 10 under the mated state is pulled rearward, the sloping surface of the rear end of the latch 26 is pressed against the mating latch 82. Thus, the engagement between the latch 26 and the mating latch 82 is not released when the charging connector 10 is merely pulled rearward. The charging connector 10 under the mated state can be detached from the inlet 80 as described below.

Referring to FIG. 14 together with FIG. 13, first, the operation portion 24 is pushed downward so that the latch 26 is moved upward. Then, when the charging connector 10 is pulled rearward, the charging connector 10 takes a state which is equal to the intermediate state. Referring to FIG. 13 together with FIG. 12, when the charging connector 10 is further pulled rearward, the charging connector 10 takes the separated state.

Hereafter, explanation will be made about the switch mechanism 40 of the present embodiment.

Referring to FIGS. 12 and 13, as described above, the latch 26 is moved between the engageable position shown in FIG. 12 and the released position shown in FIG. 13 in accordance with an operation of the charging connector 10. Referring to FIGS. 12 and 14, when the latch 26 is located at the engageable position, the temporary maintenance mechanism 50 pushes the switch mechanism 40 downward. As a result, the switch mechanism 40 is partially pressed against the catch portion 18. This position of the switch mechanism 40 is referred to as an initial position. When the switch mechanism 40 is located at the initial position, the pressed portion 45 of the switch mechanism 40 is apart from the cooperation portion 32 of the lock lever 20 and is located above the cooperation portion 32.

Figure 15:
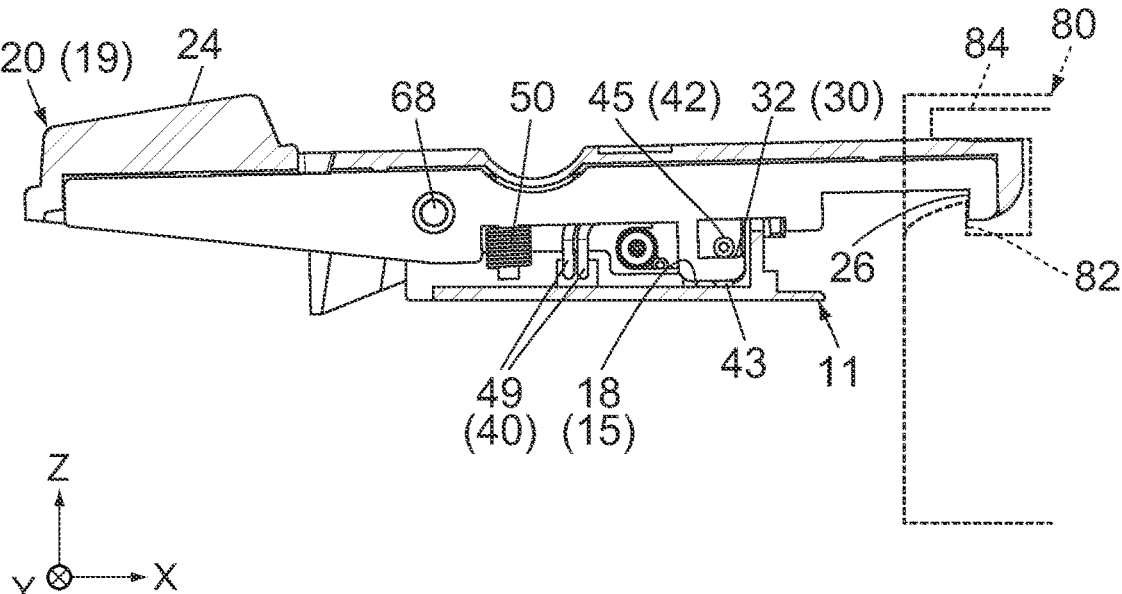
FIG. 15 is a cross-sectional view showing the inner assembly of FIG. 12, wherein the connector is under a completely mated state where the connector is completely mated with the inlet, and an operation portion is operated so that the latch is located at a predetermined position.

As can be seen from FIGS. 12, 13 and 15, in a process where the latch 26 is moved from the engageable position toward the released position, the cooperation portion 32 of the lock lever 20 is moved upward and is brought into abutment with the pressed portion 45 of the switch mechanism 40. The position of the latch 26 at that time is referred to as a predetermined position. The predetermined position is a position shown in FIG. 15 and is a position between the engageable position and the released position. Thus, the latch 26 is movable in the upper-lower direction between the engageable position and the released position via the predetermined position in accordance with the operation of the operation portion 24.

The cooperation portion 32 is moved in the upper-lower direction in cooperation with the movement of the latch 26 in the upper-lower direction. The cooperation portion 32 of the present embodiment is moved upward when the latch 26 is moved upward and is moved downward when the latch 26 is moved downward. However, the present invention is not limited thereto. As described later, the cooperation portion 32 may be moved downward when the latch 26 is moved upward and may be moved upward when the latch 26 is moved downward.

When the latch 26 is moved upward beyond the predetermined position, the cooperation portion 32 pushes the pressed portion 45 upward. As a result, the switch mechanism 40 is moved upward to be away from the initial position. As described above, the switch mechanism 40 is incorporated in the connector body 11 (see FIG. 3) so as to be movable in the upper-lower direction. The switch mechanism 40 is located at the initial position when the latch 26 is located at the engageable position. When the latch 26 is located at the released position, the switch mechanism 40 is located at a position shown in FIG. 13 which is referred to as an intermediate position. Thus, the switch mechanism 40 is located at the intermediate position when the latch 26 is located at the released position.

Referring to FIG. 12 together with FIG. 5, when the switch mechanism 40 is located at the initial position, the button 43 of the switch body 42 is pressed against the catch portion 18 and is pushed by the catch portion 18. The state of the switch body 42 at that time is referred to as an initial state. Thus, the switch body 42 takes the initial state when the switch mechanism 40 is located at the initial position. Referring to FIG. 13, under a state where the switch mechanism 40 is located at the intermediate position, the button 43 is not pressed against the catch portion 18 even if the button 43 is in contact with the catch portion 18. Therefore, the button 43 is not pushed. The state of the switch body 42 at that time is referred to as a released state. Thus, the switch body 42 takes the released state when the switch mechanism 40 is located at the intermediate position.

Referring to FIGS. 12, 13 and 15, the switch body 42 of the present embodiment takes the initial state when the latch 26 is located between the engageable position shown in FIG. 12 and the predetermined position shown FIG. 15. The switch body 42 takes the released state when the latch 26 is located between the predetermined position and the released position shown in FIG. 13. However, in general, the switch body 42 takes the initial state even when the button 43 is pressed to some extent. Therefore, the state of the switch body 42 may be changed to the released state when the latch 26 is moved toward the released position beyond the predetermined position to some extent.

Referring to FIGS. 12 to 14, as previously describe, the state of the switch body 42 is sent to the power system (not shown) via the signal wires 49. The power system determines, by using a method based on a predetermined standard, whether the charging connector 10 is under a state where charging is allowed or not. For example, the power system supplies electric power to the charging connector 10 when the switch body 42 is under the initial state and the charging connector 10 is under the mated state. The power system does not supply electric power to the charging connector 10 unless the aforementioned charging condition is satisfied.

Referring to FIG. 15, when the power system (not shown) supplies electric power to the inlet 80 via the charging connector 10, high voltage electric current flows between the terminals 16 (see FIG. 1) of the charging connector 10 and mating terminals (not shown) of the inlet 80. The charging connector 10 and the inlet 80 have a lock mechanism for preventing electric shock which might be caused because of such high voltage electric current. More specifically, when charging starts, the inlet 80 of the present embodiment places a lock portion 84 above the latch 26 to regulate an upward movement of the latch 26. As a result, the latch 26 is locked, and thereby the charging connector 10 cannot be detached from the inlet 80. When the charging of the mating device (not shown) ends, the lock portion 84 is removed. As a result, the latch 26 is unlocked, and thereby the charging connector 10 can be removed from the inlet 80.

As described above, according to the present embodiment, the state of the switch body 42 is changed in accordance with the operation of the operation portion 24. However, two requirements described below are required for the charging connector 10. The first requirement is that the state of the switch body 42 is not changed to the released state under a locked state where the latch 26 is locked even when the operation portion 24 is operated. Second requirement is that the released state of the switch body 42 is maintained until the mating of the charging connector 10 is completed.

Referring to FIG. 15, according to the existing technique, when the latch 26 is engaged, the lock portion 84 regulates the movement of the lock lever 20 to lock the latch 26. However, considering tolerance, the lock lever 20 under the thus-locked state has a play. The first requirement requires that the state of the switch body 42 is not changed as long as the lock lever 20 is moved within the range of this play. Therefore, in order to satisfy the first requirement, the switch body 42 should be arranged in the vicinity of a part of the lock lever 20 which is only slightly moved in accordance with the operation of the operation portion 24. More specifically, the switch body 42 should be arranged in the vicinity of the rotation axis 68 of the lock lever 20.

In order to satisfy the second requirement, the switch body 42 should continuously maintain the released state unless the latch 26 is engaged with the mating latch 82. In other words, the switch body 42 should continuously maintain the released state even when the latch 26 is merely slightly moved vertically. Therefore, in order to satisfy the second requirement, the switch body 42 should be arranged in the vicinity of a part of the lock lever 20 which is largely moved in accordance with the operation of the operation portion 24. More specifically, the switch body 42 should be arranged to be apart from the rotation axis 68 of the lock lever 20.

As can be seen from the explanation described above, when a charging connector comprises a small switch which is typically used, the charging connector cannot meet both the first and second requirements.

In contrast, referring to FIGS. 14 and 15, the temporary maintenance mechanism 50 of the present embodiment temporarily maintains the switch mechanism 40 at the initial position where the switch body 42 takes the initial state when the latch 26 is located between the engageable position shown in FIG. 14 and the predetermined position shown in FIG. 15, or when the latch 26 is close to the engageable position. Therefore, even if the lock lever 20 is moved within the range defined by the play in accordance with the operation of the operation portion 24 under a state where the latch 26 is locked, the initial state of the switch body 42 is maintained. Thus, the first requirement is satisfied.

Referring to FIGS. 13 and 15, the cooperation portion 32 presses the pressed portion 45 of the switch mechanism 40 to move the switch mechanism 40 from the initial position against the temporary maintenance mechanism 50 and thereby changes the state of the switch body 42 from the initial state to the released state when the latch 26 is located between the predetermined position shown in FIG. 15 and the released position shown in FIG. 13, or the latch 26 is apart from the engageable position beyond the predetermined position. Therefore, the released state of the switch body 42 is maintained until the mating of the charging connector 10 is completed so that the latch 26 is located between the engageable position and the predetermined position. Thus, the second requirement is satisfied.

Summarizing the explanation described above, the movement range of the latch 26 of the present embodiment is divided into two ranges. In one of the two ranges, only the latch 26 is moved. In a remaining one of the two ranges, the switch mechanism 40 is moved in accordance with the movement of the latch 26. The present embodiment provides the charging connector 10 comprising the switch body 42 whose state is not changed to the released state even if the operation portion 24 is operated under the locked state and is maintained to the released state until the mating of the charging connector 10 is completed.

The present embodiment can be further variously modified in addition to the already described various modifications. Hereafter, explanation will be made about some of modifications of the present embodiment.

Figure 16:
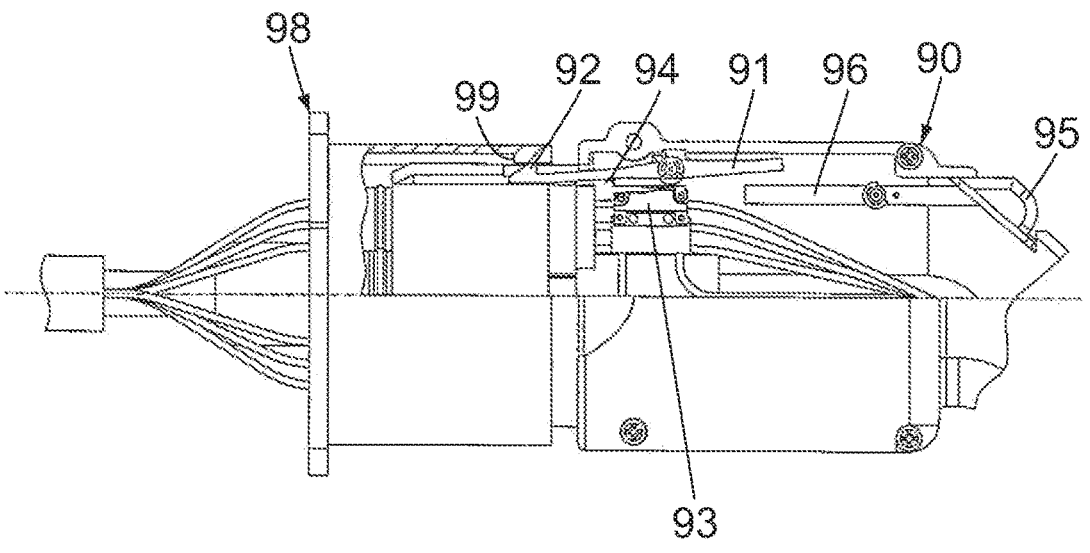
FIG. 16 is a side view partially showing a charging connector of Patent Document 1 together with a mating connector.

Referring to FIG. 12, the latch 26 of the present embodiment faces downward. When the operation portion 24 is pushed downward, the latch 26 is moved upward. However, the present invention is not limited thereto. For example, referring to FIG. 12 together with FIG. 16, the latch 26 may face upward. In this instance, the operation portion 24 may be a member separated from the lock lever 20. Instead, the operation portion 24 may be a part of the lever body 22 but may be located between the rotation axis 68 and the latch 26 in the front-rear direction. Thus, when the operation portion 24 is pushed downward, the latch 26 may be moved downward.

Referring to FIG. 12, the switch mechanism 40 of the present embodiment is located below the lock lever 20. However, the present invention is not limited thereto. For example, in an instance where the latch 26 faces upward, the switch mechanism 40 may be located above the lock lever 20. In this instance, the catch portion 18 may be a part of the side covers 13 (see FIG. 3) and may be located above the switch mechanism 40. The temporary maintenance mechanism 50 may press the button 43 (see FIG. 13) of the switch mechanism 40 which is located at the initial position against the catch portion 18 which is located above the switch mechanism 40. When the latch 26 is moved downward, the cooperation portion 32 may push the pressed portion 45 downward.

The rotation axis 68 of the present embodiment is located in the vicinity of a rear end of the switch mechanism 40. However, the present invention is not limited thereto. For example, in an instance where the latch 26 faces downward and the switch mechanism 40 is located above the lock lever 20, the rotation axis 68 may be located in the vicinity of a front end of the switch mechanism 40. In this instance, the temporary maintenance mechanism 50 may be located in the vicinity of the rotation axis 68, and the cooperation portion 32 and the pressed portion 45 may be located rearward of the temporary maintenance mechanism 50. In this instance, the catch portion 18 may be a part of the side covers 13 (see FIG. 3) and may be located above the switch mechanism 40.

The switch body 42 of the present embodiment takes the initial state when the button 43 (see FIG. 13) is pressed against the catch portion 18 and takes the released state when the button 43 is apart from the catch portion 18 to some extent. However, the present invention is not limited thereto. For example, when the latch 26 is moved upward in an instance where the switch mechanism 40 is located below the lock lever 20 and the rotation axis 68 is located in the vicinity of the front end of the switch mechanism 40, the cooperation portion 32 may be moved downward to push the pressed portion 45 downward. Thus, the switch body 42 may take the initial state when the button 43 is apart from the catch portion 18 to some extent and may take the released state when the button 43 is pressed against the catch portion 18.

The switch body 42 of the present embodiment takes the initial state, or an on-state where its inner contact points (not shown) are electrically connected with each other, when the button 43 (see FIG. 13) is pressed against the catch portion 18 and takes the released state, or an off-state where the inner contact points are apart from each other, when the button 43 is apart from the catch portion 18 to some extent. However, the present invention is not limited thereto. For example, the switch body 42 may take the off-state, or the initial state, when the button 43 is pressed against the catch portion 18 and may take the on-state, or the released state, when the button 43 is apart from the catch portion 18 to some extent.

The temporary maintenance mechanism 50 is not limited to a coil spring. For example, the temporary maintenance mechanism 50 may be another spring such as a torsion spring. Moreover, the temporary maintenance mechanism 50 is not limited to a spring. For example, an anchor may be attached to a front end of the switch plate 46. This anchor may work as the temporary maintenance mechanism 50.

The temporary maintenance mechanism 50 may be formed as described below. First, the side cover 13 (see FIG. 3) is modified to be provided with a dome-like projection (bulge). In addition, the switch mechanism 40 is modified to be formed with a recessed portion (receiving portion), a groove and a wall. The groove is located below the receiving portion. The wall is located between the receiving portion and the groove. When the switch mechanism 40 is located at the initial position, the bulge is received in the receiving portion. When the cooperation portion 32 presses the pressed portion 45 upward in accordance with a movement of the lock lever 20, the switch mechanism 40 is moved upward from the initial position, and the bulge rides over the wall to be received in the groove. According to this structure, the bulge, the receiving portion, the groove and the wall described above work as the temporary maintenance mechanism 50.

As can be seen from the explanation described above, the structure of the sub-assembly 19 can be variously modified in accordance with combined conditions including the facing direction of the latch 26, the arrangement of the switch mechanism 40, the position of the rotation axis 68, etc.

What is claimed is:

1. A charging connector comprising a connector body, a lock lever, an operation portion, a cooperation portion, a switch mechanism and a temporary maintenance mechanism, wherein:

the lock lever is incorporated in the connector body;

the lock lever has a latch;

the latch is movable in an upper-lower direction between an engageable position and a released position via a predetermined position in accordance with an operation of the operation portion;

the cooperation portion is moved in the upper-lower direction in cooperation with a movement of the latch in the upper-lower direction;

the switch mechanism is incorporated in the connector body so as to be movable in the upper-lower direction;

the switch mechanism is located at an initial position when the latch is located at the engageable position;

the switch mechanism includes a switch body which is movable in the upper-lower direction and a pressed portion;

the switch body takes an initial state when the switch mechanism is located at the initial position;

the temporary maintenance mechanism temporarily maintains the switch mechanism at the initial position when the latch is located between the engageable position and the predetermined position; and when the latch is located between the predetermined position and the released position, the cooperation portion presses the pressed portion of the switch mechanism to move the switch mechanism from the initial position against the temporary maintenance mechanism and thereby changes a state of the switch body from the initial state to a released state.

2. The charging connector as recited in claim 1, wherein:

the charging connector comprises a sub-assembly;

the sub-assembly includes the lock lever, the operation portion, the cooperation portion, the switch mechanism and the temporary maintenance mechanism; and the sub-assembly is incorporated in the connector body.

3. The charging connector as recited in claim 2, wherein:

the temporary maintenance mechanism is a coil spring; and one of opposite ends of the coil spring is attached to the switch mechanism, and a remaining one of the opposite ends of the coil spring is attached to the lock lever.

4. The charging connector as recited in claim 2, wherein:

the switch mechanism includes a switch plate;

the switch body is supported by the switch plate; and the switch plate is attached to the lock lever to be pivotable.

5. The charging connector as recited in claim 1, wherein:

the lock lever includes a lever body and a reinforcement member; and the cooperation portion is a part of the reinforcement member.

6. A charging connector comprising a connector body, a lock lever, an operation portion, a cooperation portion, a switch mechanism and a temporary maintenance mechanism, wherein:

the lock lever is incorporated in the connector body;

the lock lever has a latch;

the latch is movable in an upper-lower direction between an engageable position and a released position via a predetermined position in accordance with an operation of the operation portion;

the cooperation portion is moved in the upper-lower direction in cooperation with a movement of the latch in the upper-lower direction;

the switch mechanism is incorporated in the connector body so as to be movable in the upper-lower direction;

the switch mechanism is located at an initial position when the latch is located at the engageable position;

the switch mechanism includes a switch body and a pressed portion;

the switch body takes an initial state when the switch mechanism is located at the initial position;

the temporary maintenance mechanism temporarily maintains the switch mechanism at the initial position when the latch is located between the engageable position and the predetermined position;

when the latch is located between the predetermined position and the released position, the cooperation portion presses the pressed portion of the switch mechanism to move the switch mechanism from the initial position against the temporary maintenance mechanism and thereby changes a state of the switch body from the initial state to a released state;

the charging connector comprises a sub-assembly;

the sub-assembly includes the lock lever, the operation portion, the cooperation portion, the switch mechanism and the temporary maintenance mechanism;

the sub-assembly is incorporated in the connector body;

the switch mechanism includes a switch plate;

the switch body is supported by the switch plate; and the switch plate is attached to the lock lever to be pivotable.

* * * * *